United States Patent [19]

Ido et al.

[11] Patent Number: 4,545,526
[45] Date of Patent: Oct. 8, 1985

[54] AIR CONDITIONER FOR VEHICLE

[75] Inventors: Akinori Ido; Goró Uchida, both of Toyota, Japan

[73] Assignees: Toyota Jidosha Kabushiki Kaisha; Nippondenso Co., Ltd., both of Japan

[21] Appl. No.: 623,437

[22] Filed: Jun. 22, 1984

[30] Foreign Application Priority Data

Jun. 27, 1983 [JP] Japan .............................. 57-99270[U]

[51] Int. Cl.[4] .............................................. B60H 1/02
[52] U.S. Cl. .................................. 237/12.3 A; 98/2.05
[58] Field of Search ...................... 237/12.3 A, 12.3 B; 98/2, 2.05, 2.06, 2.08, 2.11; 236/13, 49

[56] References Cited

U.S. PATENT DOCUMENTS 2,445,392  7/1948  Findley ........................... 237/12.3 B
3,948,312  4/1976  Nisbet ............................. 237/12.3 B
4,383,642  5/1983  Sumikawa et al. ............. 237/12.3 A Primary Examiner—Henry Bennett
Attorney, Agent, or Firm—Parkhurst & Oliff

[57] ABSTRACT

An air conditioner for a vehicle has a heater core for heating air blown from upstream thereof and discharging the heated air downstream thereof. An air passage is arranged in parallel with the heater core, and the air flow through the heater core and the air passage is controlled by a rotatable damper. A first chamber is provided downstream of the heater core and air passage for mixing the heated air from the heater core with non-heated air from the air passage. A second chamber is provided downstream of the first chamber for distributing the mixed air to a ventilation diffuser and/or to a third chamber. The third chamber can distribute the air alternatively to a defroster or a heater diffuser. Closable bypass passages are provided directly connecting the discharge end of the heater core with the third chamber, so that extra heated air may be moved directly to the third chamber when desired, thereby allowing the passenger to have cool air around his head and heated air around his legs.

13 Claims, 6 Drawing Figures

AIR CONDITIONER FOR VEHICLE

BACKGROUND OF THE INVENTION

This invention relates to improvements in an air conditioner for a vehicle, capable of providing sufficient hot air even with a long air passage from a heater core to a heater diffuser, so that a driver or passenger of a vehicle can get cool air around his head and hot air around his legs.

The present inventors heretofore have developed an improved an air conditioner, as disclosed in the structure shown in U.S. patent application Ser. No. 597924, and also have developed an experimental model for an air conditioner for a vehicle as shown in FIGS. 5 and 6, (which was designed and performance tested for an experiment in our laboratory not open for public).

The model comprises a heater core for heating air, the air being blown from upstream of the heater core and discharged downstream of the heater core, an air passage arranged in parallel with the heater core, a first damper arranged upstream of the heater core and the air passage and being rotatable for controlling the amount of air passing through the heater core and the amount of air passing through the air passage in accordance with the rotational angle thereof, a first chamber (A) arranged downstream of the heater core and the air passage for mixing the heated air discharged from the heater core and non-heated air passed through the air passage to produce mixed air having suitable temperature (not too cold, not too hot), a second chamber (B) provided a downstream of the first chamber (A) for distributing the mixed air to a ventilation diffuser formed at an instrument panel, so that a passenger can get the mixed air around his head, and a third chamber (C) provided a downstream of the second chamber (B) and having at least one heater diffuser for diffusing the mixed air.

This, however, increases the length of the air passage from the air inlet to the heater and defroster chamber (C), thereby resulting in an increase in the resistance. Thus, the temperature of air from both the heater diffuser and defroster outlet is decreased or rather cool. Further, hot air and cold air are so completely mixed due to the long air passage, that it is hard to obtain the cool air suitable for diffusing from ventilation outlets (E) (F) (G) (connected to a ventilation diffuser formed at the instrument panel by a ventilation duct), and the hot air suitable for diffusing from heater diffuser (H) and defroster outlet (I) (connecting to defroster diffuser formed in the top portion of the instrument panel by a defroster duct) when the device is in the bilevel mode.

SUMMARY OF THE INVENTION

It therefore is a purpose of the present invention to provide an air conditioner for a vehicle which can provide sufficient or suitable air temperatures even with a long air passage to a heater and defroster outlet, so that a driver or passenger in the vehicle can get cool air around his head and hot air around his legs.

According to the present invention, there is provided an air conditioner for a vehicle, which comprises a heater core for heating air blown from upstream of the heater core and discharges the heated air downstream of the heater core, an air passage arranged in parallel with the heater core, a first damper arranged upstream of the heater core and the air passage and rotatable to control the amount of air passing through the heater core and the amount of air passing through the air passage in accordance with the rotation angle thereof, a first chamber arranged downstream of the heater core and the air passage for mixing heated air discharged from the heater core and non-heated air passed through the air passage to produce mixed air having suitable temperature, a second chamber provided at downstream of the first chamber for distributing the mixed air to a ventilation diffuser formed at an instrument panel so that a passenger can get the mixed air around his head, a third chamber provided downstream of the second chamber and having at least one heater diffuser, and at least one air bypass duct for directly connecting the first chamber and the third chamber, the bypass duct having an inlet downstream of said heater core and an outlet in said third chamber for distributing the heated air discharged from the heater core to the heater diffuser to diffuse or exhaust the heated air, which has a higher temperature than the mixed air. Thus, a satisfactory amount of heated air can be supplied to the heater diffuser, and the hot air can be diffused from the heater diffuser even if the first damper is controlled to mix a little amount of the heated air, and a large amount of the non-heated air and make rather cool air in the first chamber in the bilevel mode, so that a driver or passenger of the vehicle can get sufficient cool air around his head and hot air around his legs.

BRIEF DESCRIPTION OF THE DRAWINGS

The above and other related objects and features the invention will be apparent from a reading of the following description of the disclosure in conjunction with the accompanying drawings and the appended claims.

DESCRIPTION OF THE PREFERRED EMBODIMENTS

The present invention will now be described in more detail with respect to the accompanying drawings.

Figure 1:
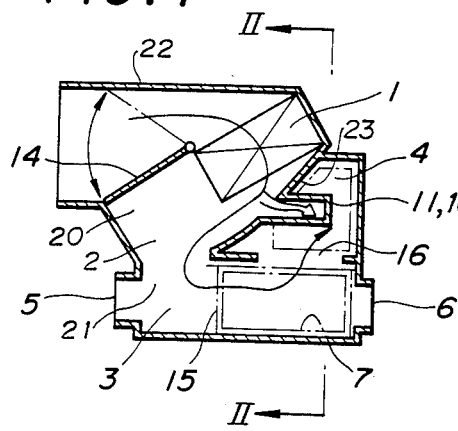
FIG. 1 is a sectional view showing an embodiment of an air conditioner for a vehicle constructed according to the present invention.
Figure 2:
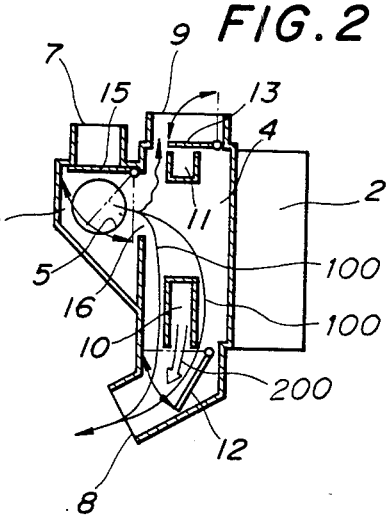
FIG. 2 is a side sectional view taken along the line II—II in FIG. 1 in the heater mode.

FIG. 1 shows a plan sectional view of an embodiment of an air conditioner constructed according to the present invention, and FIG. 2 is a side sectional view taken along the line II—II in FIG. 1. As shown, a heater core 1 for heating air blown from upstream of the heater core and discharging the heated air downstream of the heater core is arranged in an inlet duct 22, and a first passage 20 is provided in parallel with the heater core 1. A first damper 14 is rotatably provided to control the amount of air passing through the heater core 1 and the amount of air passing through the air passage 20 upstream of the heater core 1 and the first air passage 20.

An air mixing chamber 2 for mixing the heated air discharged from the heater core and the non-heated air passed through the air passage 20 is formed downstream of the heater core 1 and the first air passage 20. A ventilation chamber 3 is provided to communicate through a second air passage 21 with the air mixing chamber 2 and is provided downstream of the mixing chamber 2. The ventilation chamber 3 distributes the mixed air through a center ventilation outlets 7 and left and right side ventilation outlet 5 and 6, which connect to center, left and right ventilation diffused formed and the instrument panel through ventilation ducts. A second damper 15 for controlling the amount of air exhausted from the ventilation outlets 5, 6 and 7 into automotive compartments through the ducts and the ventilation diffusers can close or open the ventilation outlets 5, 6, and 7.

A heater and defroster chamber 4 is arranged to communicate through a third air passage 16 at the side of the downstream of the ventilation chamber 3. A heater diffuser 8 is provided at the lower part of the heater and defroster chamber 4. A defroster outlet 9 is formed at the upper part of the heater and defroster chamber 4 and connects to defroster diffuser formed on the top portion the instrument panel by defroster ducts.

The air mixing chamber 2 and the heater defroster chamber 4 are partitioned by a partition wall 23. A heater bypass duct 10 and a defroster bypass duct 11 connect the air mixing chamber 2 directly to the heater and defroster chamber 4 at the upper and lower parts thereof. These bypass ducts 10 and 11 project from the partition wall 23 into the heater and defroster chamber 4. The heater bypass duct 10 has an inlet in the vicinity of the heater core 2, and an outlet opening in the vicinity of the heater diffuser 8. The defroster bypass duct 11 has an outlet opening in the vicinity of the defroster outlet 9. Dampers 12 and 13 are respectively provided at the ends of the heater bypass duct 10 and the defroster bypass duct 11, individually to open and close the outlets of both bypass ducts. Damper 12 has the same shape and size as the sectional shape and size of the heater diffuser 8 so that damper 12 can close and open the heater diffuser 8 also.

Opening and closing damper 15 is provided at the center ventilation chamber 3, and also operates to open and close the third air passage 16 between the ventilation chamber 3 and the heater defroster chamber 4. In addition to dampers 13 and 12, opening and closing dampers (not shown) are also provided at the defroster outlet 9, and the ventilation outlets 5 and 6.

In operation of the air conditioner thus constructed as described above, when the ventilation outlets 5, 6, 7 and the defroster bypass duct 11 are closed, as shown in FIG. 2 (which shows the situation in the heater mode) the first damper 14 normally closes the first air passage 20, and the heater bypass duct 10 is opened, allowing plenty of heated air (200) to flow from the heater bypass duct 10 in addition to the air (100) exhausted from the third air passage 16 to the heater and defroster chamber 4 through the ventilation chamber 3 from the air mixing chamber 2, thereby significantly increasing temperature of the diffusing heated air in the heater mode.

Figure 3:
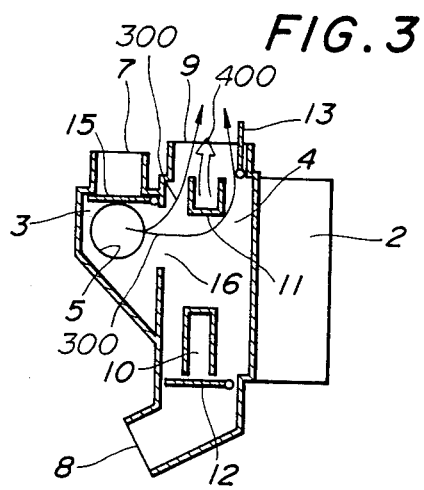
FIG. 3 is a side view at the same position as in FIG. 2 in the defroster mode.

When the defroster bypass duct 11 is opened and the heater bypass duct 10 is closed, as shown in FIG. 3 (which shows the situation at the defroster mode) the first damper 14 normally closes the first air passage 20. A great deal of air (400) flows from the defroster bypass duct 11 in addition to the air (300) exhausted from the third air passage 16 to the heater and defroster chamber 4, thereby remarkably increasing the temperature of the diffusing heated air in the defroster mode.

Figure 4:
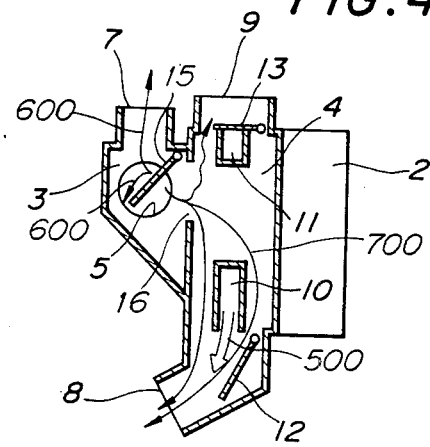
FIG. 4 is a side view at the same position as in FIG. 2 in the bilevel mode.
Figure 5:
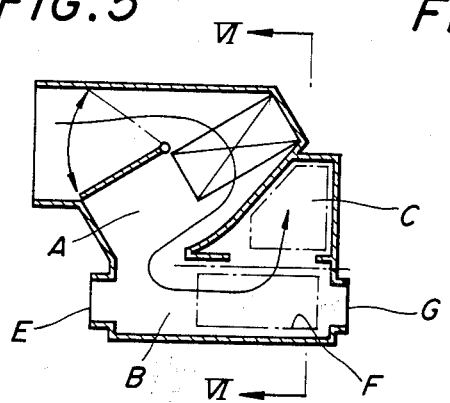
FIG. 5 is a plan sectional view showing a non publicly opened experimental model of an air conditioner.
Figure 6:
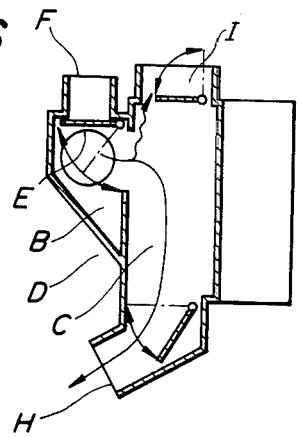
FIG. 6 is a side sectional view taken along the line VI—VI in FIG. 5.

Further, when the damper 15 is opened by half, as shown in FIG. 4, the damper 14 of the first air passage also is opened by half (rotating almost parallel with the inlet duct), and the damper 12 is opened and the damper 13 is closed (the situation in the bilevel mode) a lot of heated air (500) from the heater bypass duct 10 in addition to the mixed air (700) is diffused from the diffuser 8 to heat the leg portion, while rather cool mixed air (600) diffuses from the outlets 5, 6, 7 for the ventilation to cool the head portion.

In the embodiment exemplified in FIGS. 1 to 4, two bypass ducts 10, 11 are provided and respectively opened toward the specific directions. However, these bypass ducts may also have only one inlet in the first chamber, a dividing intermediate portion and two outlets opening into the heater and defroster chamber 4.

According to the present invention as described above, sufficient heated hot air can be supplied through the bypass ducts even if the heater and defroster air passage is very long, hot air can be diffused from the bypass duct to theat the leg portion in any mode (heater, defroster) and cool air can be diffused from the ventilation diffuser to cool the head portion in bilevel mode.

What is claimed is:

1. An air conditioner for a vehicle comprising:
   a heater core for heating air blown from upstream thereof and for discharging heated air downctream thereof;
   an air passage arranged in parallel with said heater core;
   a first damper arranged upstream of said heater core and said air passage and being rotatable for controlling the amount of air passing through said heater core and the amount of air passing through said air passage in accordance with the rotational angle thereof;
   a first chamber arranged downstream of said heater core and said air passage for mixing the heated air discharged from said heater core and non-heated air passed through said air passage, whereby to produce mixed air having a suitable temperature;
   a second chamber provided downstream of said first chamber for distributing the mixed air to a ventilation diffuser formed at an instrument panel, whereby a passenger can get mixed air around his head;
   a third chamber provided downstream of said second chamber and having at least one heater diffuser; and
   at least one air bypass duct for directly connecting said first chamber and said third chamber, said bypass duct having an inlet in the downstream of said heater core and an outlet in said third chamber, whereby the passenger can get hot air from the heater diffuser around his legs and rather cool air from the ventilation diffuser around his head even if said first damper is controlled to flow a large amount of non-heated air and a small amount of heated air into said first chamber.

2. An air conditioner for a vehicle comprising:
   a heater core for heating air blown from upstream thereof and for discharging heated air downstream thereof;
   an air passage arranged in parallel with said heater core;
   a first damper arranged upstream of said heater core and said air passage and being rotatable for controlling the amount of air passing through said heater core and the amount of air passing through said air passage in accordance with the rotational angle thereof;

a first chamber arranged downstream of said heater core and said air passage for mixing the heated air discharged from said heater core and non-heated air passed through said air passage, whereby to produce mixed air having a suitable temperature;

a second chamber provided downstream of said first chamber for distributing the mixed air to a ventilation diffuser formed at an instrument panel;

a third chamber provided downstream of said second chamber and having at least one defroster outlet;

a defroster duct connecting the defroster outlet and a defroster diffuser formed on the top portion of the instrument panel; and an air bypass duct for directly connecting said first chamber and said third chamber, said bypass duct having an inlet in the downstream of said heater core and an outlet in the vicinity of the defroster outlet, whereby a passenger can get hot air from the defroster diffuser and rather cool air from the ventilation diffuser around his head even if said first damper is controlled to flow a large amount of non-heated air and a small amount of heated air into said first chamber.

3. An air conditioner for a vehicle comprising:

a first inlet for intaking air from the atmosphere into a case of the air conditioner;

a first outlet for a ventilation duct connecting to a ventilation diffuser formed at an instrument panel;

a heater core provided downstream of said first inlet in the case;

a first air passage provided in parallel with said heater core in the case;

a first damper arranged upstream of said heater core and said first air passage and being rotatable for controlling the amount of air passing through said heater core and the amount of air passing through said first air passage in accordance with the rotational angle thereof;

a first chamber arranged downstream of said heater core and said first air passage for mixing the heated air exhausted from said heater core and non-heated air passed through said first air passage, whereby to produce mixed air having a suitable temperature;

a second chamber provided downstream of said first chamber for distributing the mixed air to a ventilation diffuser formed at the instrument panel through said first outlet and the ventilation duct;

a first partition for dividing said first chamber from said second chamber, having a second air passage for inflowing the mixed air from said first chamber into said second chamber, whereby the heated air and the non-heated air become well mixed and the mixed air has suitable temperature upstream of the second air passage;

a third chamber provided downstream of said second chamber, having at least one heater diffuser, through which a passenger can get the mixed air around his legs;

a second partition for dividing said second chamber from said third chamber, having a third air passage for inflowing the mixed air from said second chamber into said third chamber; and an air bypass duct for connecting said first chamber directly to said third chamber, having a second inlet downstream of said heater core and an outlet in said third chamber, whereby the passenger can get hot air from the heater diffuser around his legs and rather cool air from the ventilation diffuser around his head even if said first damper is controlled to flow a large amount of non-heated air and a small amount of heated air into the first chamber.

4. The air conditioner for a vehicle according to claim 1, wherein said first chamber and said third chamber is are separated by a partition.

5. The air condition for a vehicle according to claim 1, wherein the inlet of said bypass duct is arranged in the vicinity of said heater core, and its outlet opens in the vicinity of the heater diffuser projected into said third chamber.

6. The air conditioner for a vehicle according to claim 1 further comprising, a second damper rotatably fixed in the vicinity of the heater diffuser for selectively opening and closing the heater diffuser.

7. The air conditioner for a vehicle according to claim 1 further comprising, a third damper rotatably secured in the vicinity of the ventilation diffuser for selectively opening and closing the ventilation diffuser.

8. The air conditioner for a vehicle according to claim 6, wherein said second damper can close the outlet of said air bypass duct at the same time as it closes the heater diffuser.

9. The air conditioner for a vehicle according to claim 1, wherein the sectional area of said air bypass duct is smaller than the sectional area of said heater diffuser.

10. The air conditioner for a vehicle according to claim 2, further comprising, a second damper rotatably is secured in the vicinity of said defroster diffuser for selectively opening and closing said defroster diffuser.

11. The air conditioner for a vehicle according to claim 2, wherein the sectional area of said air bypass passage is smaller than the sectional area of said defroster diffuser.

12. The air conditioner for a vehicle according to claim 3, wherein said first outlet connects to a center ventilation diffuser, and left and right side ventilation diffusers by a ventilation duct.

13. The air conditioner for a vehicle according to claim 3, further comprising a second outlet in said third chamber for connecting by a defroster duct to a defroster diffuser formed on the top portion of the instrument panel.

* * * * *